W. OBENCHAIN.

Balanced Slide-Valves.

No. 6,225. Reissued Jan. 12, 1875.

Attest
Saml H. Gregory
C. M. Cornell

Inventor
Washington Obenchain

THE GRAPHIC CO. PHOTO-LITH. 39 & 41 PARK PLACE, N.Y.

UNITED STATES PATENT OFFICE.

WASHINGTON OBENCHAIN, OF LOGANSPORT, INDIANA.

IMPROVEMENT IN BALANCED SLIDE-VALVES.

Specification forming part of Letters Patent No. 146,701, dated January 20, 1874; reissue No. 6,225, dated January 12, 1875; application filed October 28, 1874.

*To all whom it may concern:*

Be it known that I, WASHINGTON OBENCHAIN, of Logansport, in the county of Cass and State of Indiana, have invented a new and useful Improvement in that class of valves usually denominated Balanced Slide-Valves; and I do hereby declare that the following is a full and accurate description of the construction and operation of the same, reference being had to the annexed drawings making a part of this specification, and to the letters of reference marked thereon.

Figure 1:
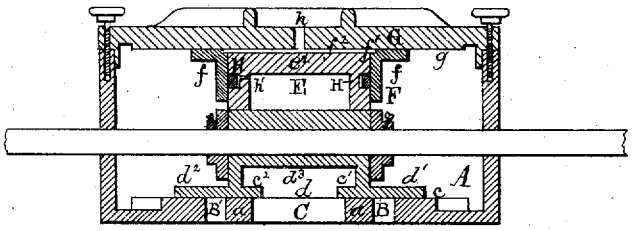
Figure 2:
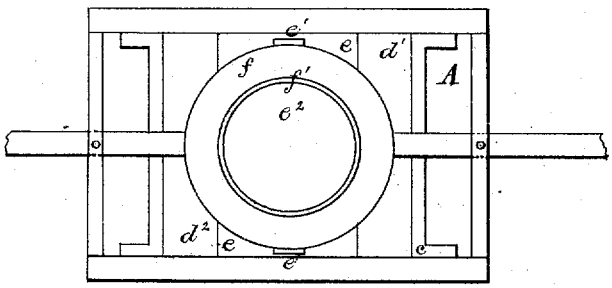
Figure 3:
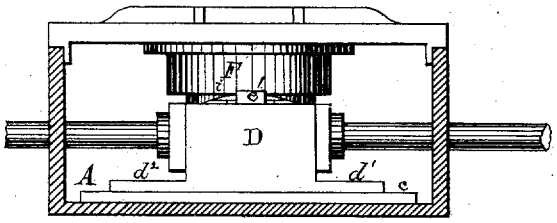

Figure 1 of the drawings is a longitudinal vertical section of my improved valve. Fig. 2 is a plan view with the steam-chest cover removed; and Fig. 3 is a side view with side of steam-chest removed.

Corresponding letters and figures refer to corresponding parts in all of the figures.

This invention relates to slide-valves for steam and other engines; and it consists in the construction, combination, and arrangement of the parts of which it is composed, as will be more fully described hereinafter, the object being to provide a partially-balanced valve, so constructed and arranged that the steam-pressure, acting thereon to hold the valve upon its seat, may be relieved to any desired extent, thereby preventing unnecessary wear and friction.

In the accompanying drawings, the letter A represents a steam-chest of common construction with steam induction-ports B B′ and an enlarged exhaust-port, C. On the valve-face *c* slides the valve D, having outwardly-projecting lips or surfaces $d^1$ $d^2$, and inwardly-projecting lips or surfaces $c^1$ $c^2$, the latter being for the purpose of retaining the steam in the cylinder after it has been cut off therefrom by the outwardly-projecting lips until the piston has reached, or nearly reached, the end of its stroke, in order that the full benefit of the expansive force of the steam may be obtained. The width of the exhaust-port *d* between the lips $c^1$ $c^2$ is contracted with reference to, or is less in width than, the exhaust-opening C in the valve-seat, such construction being necessary to enable the valve to retain the steam in the cylinder until its expansive force has been utilized or until the piston has reached, or nearly reached, the end of its stroke, as above described, and also to admit of there being an open passage from the exhausting end of the cylinder to the atmosphere at all times while such passage is necessary, and even when the induction-port upon its opposite end is fully open, thus preventing any injurious compression of steam or air in the end of the cylinder toward which the piston is moving.

The devices for releasing the downward pressure upon the valve are constructed in the following manner: To the top portion D of the valve is affixed a cylinder, E, having a closed top, to prevent the passage of steam through it. Surrounding this cylinder is a ring, F, which is provided with an external flange, *f*, and with an internal recess, $f^1$, which is in its upper and inner edge. The upper surface of this ring comes in contact with the inner surface of the steam-chest cover, and forms a tight joint therewith, leaving a small space between the top of the cylinder E and the cover. The area of the ring F and its outwardly-projecting flange is less than that of the rectangular portion D of the valve, in order that the required amount of pressure may always be left upon said portion to keep the valve upon its seat while in use, a feature which is very important in practice. It is apparent that by varying the area of the ring F the amount of downward pressure may be varied to suit it to different sizes of valves and to different pressures of steam. The recess $f^1$ in the interior of ring F is designed to insure the pressure of said ring against the surface formed upon the steam-chest cover when steam is being used, and thus causing it to form a tight joint, which prevents any steam from passing into the chamber within said ring. The importance of this recess will be seen when it is remembered that all of the surface of the ring outside thereof is in steam-tight contact with the cover of the steam-chest, and that without a space between some portion thereof and such surface there would be no actual pressure upward to preserve such contact. The area of this recessed portion of the ring should be sufficiently large to cause the steam at all times and under all pressures to keep the ring in contact with the cover of the chest when steam is being used, by which means the use of springs for such purpose will be avoided.

In the surface of the cylinder E there is formed an annular recess, into which a packing-ring, H, is inserted, in contact with which the inner surface of the ring F comes, and upon which it moves up and down, by which means the operation of said ring is made automatic, and the downward pressure is removed from the rectangular portion of the valve just in proportion to the area of its surface inclosed within said ring.

In order that the ring F may be prevented from falling too far from its seat when the steam is shut off from the chest, two small springs, *i i*, are seated on the base *e* of the cylinder E, under the lower edge of the ring F, and are held in position by the bolts *e′ e′*. These springs serve to hold the ring up to its place when steam is shut off, and thereby prevent it from slamming against the cover when steam is let into the chest, but they are not designed to press the ring up with such force as to cause friction between the ring and the steam-chest cover. Through the steam-chest cover G there is an aperture, *h*, which allows the atmosphere to enter the chamber $f^2$ between the top of cylinder E and the chest-cover.

For the purpose of holding the packing-ring H in steam-tight contact with the ring F, a small aperture, *z*, may be bored through the wall of the cylinder E for the admission of steam behind said packing-ring, which will have the effect to prevent the passage of any steam to the chamber above the valve.

Having thus described my invention, what I claim, and desire to secure by Letters Patent, is—

1. A valve for steam and other engines, the exhaust aperture of which is contracted as specified, whereby it is made of a width equal to or less than that of the exhaust-port in its seat, for the purpose set forth.

2. The partially-balanced valve D, having outwardly-projecting lips or surfaces of such length as to cause them to cut off the steam at the desired points, and inwardly-projecting lips or surfaces of such length as to cause the distance between their inner edges to be less than the width of the exhaust-port in the valve-seat, in order that they may retain the steam in the cylinder until the piston has reached a point where it is desirable to allow it to be exhausted therefrom, the construction of the valve being substantially such as is herein described.

3. The combination, with a steam-valve and valve-chest, of the balance-cylinder E, closed at top, the balance-ring F, the flange *f*, forming a part of said balance-ring, and the air recess or groove $f^1$ on the inner edge of said ring, communicating with the balance-chamber $f^2$, between the balance-cylinder and the valve-chest wall, substantially as specified.

In testimony that I claim the foregoing I have hereunto set my hand this 28th day of October, 1874.

WASHINGTON OBENCHAIN.

Witnesses:

C. M. CONNELL,

SAML. H. GREGORY.